United States Patent [19]
Harris

[11] Patent Number: 6,120,146
[45] Date of Patent: Sep. 19, 2000

[54] IDENTIFICATION TAG ASSEMBLY AND TOOL FOR EYEGLASSES

[76] Inventor: Fiona Fitzherbert Harris, 7 Latimer Rd., Santa Monica, Calif. 90402

[21] Appl. No.: 09/368,487

[22] Filed: Aug. 4, 1999

Related U.S. Application Data

[63] Continuation-in-part of application No. 09/181,623, Oct. 28, 1998, abandoned.
[60] Provisional application No. 60/063,344, Oct. 28, 1997.
[51] Int. Cl.[7] .................................................. G02C 1/00
[52] U.S. Cl. ......................... 351/158; 351/51; 351/52; 351/121
[58] Field of Search ................... 351/51, 52, 123, 351/111, 41, 121, 158

[56] References Cited

U.S. PATENT DOCUMENTS

| | | |
|---|---|---|
| 3,110,365 | 11/1963 | Sadel . |
| 4,153,346 | 5/1979 | Gomer . |
| 4,806,008 | 2/1989 | Tarloff . |
| 4,893,840 | 1/1990 | Berkowitz . |
| 4,968,128 | 11/1990 | Mendola .................................. 351/52 |
| 4,974,955 | 12/1990 | Treadaway, Sr. . |
| 5,161,234 | 11/1992 | Nitta ........................................ 351/52 |
| 5,185,620 | 2/1993 | Cooper .................................... 351/52 |
| 5,387,012 | 2/1995 | Hibbs ...................................... 283/75 |
| 5,500,693 | 3/1996 | Friedman ................................ 351/52 |
| 5,627,609 | 5/1997 | Kato . |
| 5,654,787 | 8/1997 | Barison . |

*Primary Examiner*—Hung Xuan Dang
*Attorney, Agent, or Firm*—Kelley Bauersfeld Lowry & Kelley, LLP

[57] ABSTRACT

An identification tag assembly for eyeglasses is provided whereby lost or stolen eyeglasses may be returned to its owner by viewing identification indicia on a tag which is fastened to a pair of eyeglasses. An eyeglass repair tool is attached to or otherwise formed with the tag. An embellishment is placed on the tag which may have holistic properties. The tag may be fastened to the glasses by using elastic loops which are connected to the tag and stretched over the temple member to secure the tag to a desired position on the temple member. A variety of clips and screws may also be used to secure the tag to the temple member of the pair of eyeglasses.

21 Claims, 4 Drawing Sheets

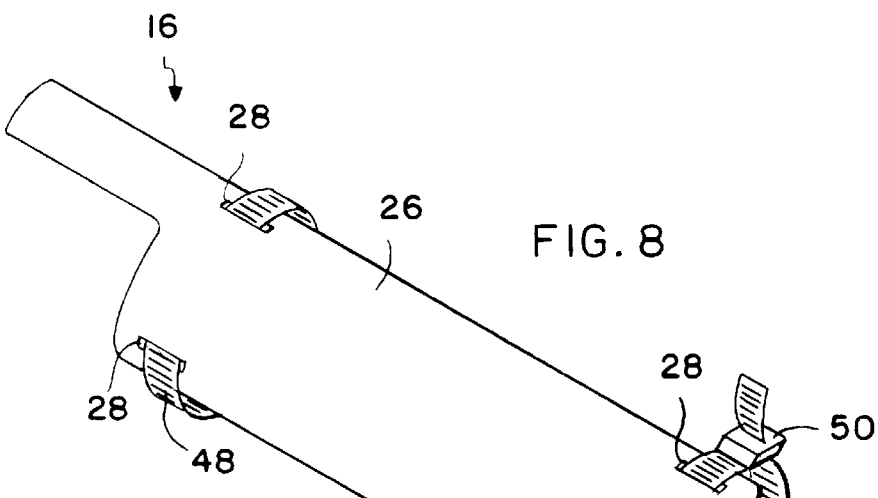
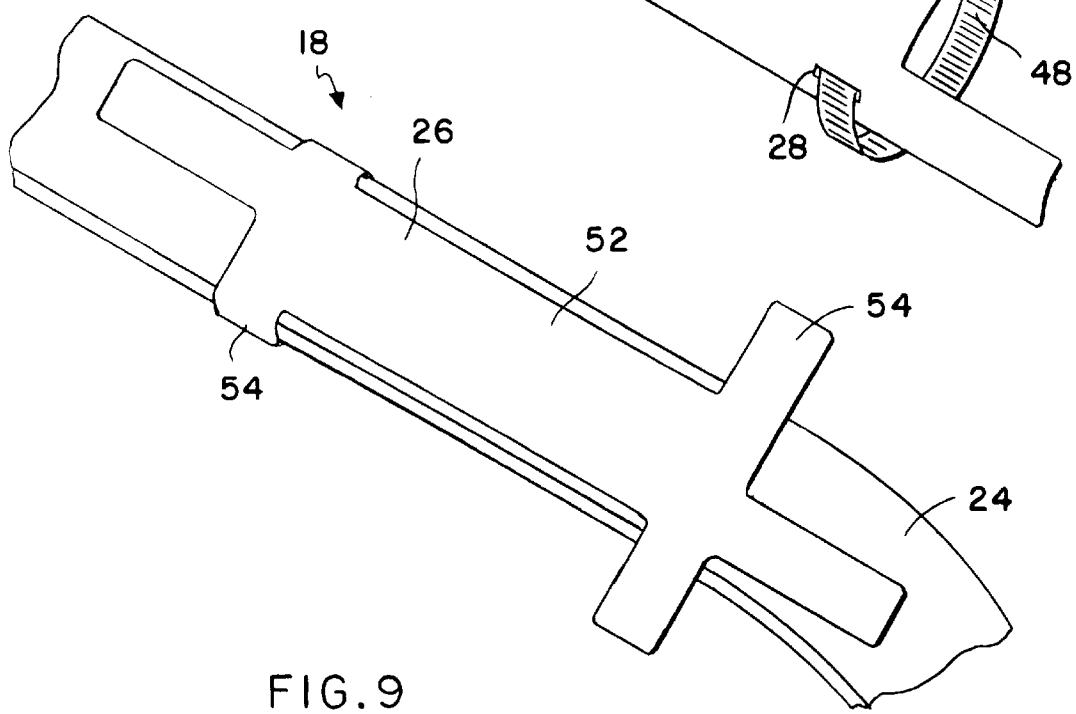

IDENTIFICATION TAG ASSEMBLY AND TOOL FOR EYEGLASSES

RELATED APPLICATION

This application is a continuation-in-part of U.S. patent application Ser. No. 09/181,623 filed Oct. 28, 1998 now abandoned which claims priority from Provisional Application No. 60/063,344 filed Oct. 28, 1997.

BACKGROUND OF THE INVENTION

This invention relates generally to eyeglasses and systems for identifying the owner of a set of eyeglasses if found by another. More specifically, the present invention is directed to an identification tag assembly having an eyeglass repair tool and a system for returning eyeglasses to the owner in the event of a loss.

Many people wear eyeglasses or sunglasses to improve visibility, reduce sun glare or for decorative effect. Most eyeglasses are prescription glasses which are uniquely suited to an individual. It is not uncommon for persons to lose or misplace portable articles that are worn or used regularly, such as eyeglasses. For example, a person wearing a pair of eyeglasses may temporarily remove them, intending to pick them up later but forgetting and leave them behind. Eyeglasses are expensive to purchase, and difficult to replace on short notice. Many sunglasses are also expensive, and may also be in the form of prescription sunglasses. Thus, loss of one's eyeglasses or sunglasses is often upsetting to the owner, expensive to replace, and can be hazardous if the owner attempts to drive without wearing his or her prescription glasses.

Several attempts have been made to solve this problem by providing a means to identify the owner of lost or misplaced eyewear. For example, for a number of years it has been known to engrave such articles with identifying indicia. In this method, an engraving machine is used to etch a surface of the article. Engraving suffers from a number of drawbacks, however. First, there is a limit on how small the etched indicia can be made. This, in turn, makes the etching method difficult and impractical for extremely small or narrow objects which may vary in size, such as small items of jewelry and eyeglass temples. Second, the machines used for engraving are costly. Independent distributors of eyeglasses are usually unable to afford machines of this type. Third, engraving leaves an impression in the surface of the article to be identified.

Another example is U.S. Pat. No. 4,606,927 to Jones which discloses a minute, color-coded identifier that is dispersed in a transparent and hardenable cementitious liquid. The liquid is applied to the article to be labeled in sufficient quantities so that one or more of the identifiers becomes attached to the article. The identifier can then be read with a magnifying device. Of course, such a method is impractical for use with portable articles that are easily lost. A person finding an article labeled in this fashion would not be alerted to the presence of the label and, even if he or she were, would be unable to decipher the color-coding identification system so that the article could be returned to its rightful owner.

U.S. Pat. No. 4,893,840 to Berkowitz discloses permanently securing identification directly onto the side of the eyeglass frames.

U.S. Pat. No. 4,806,008 to Tarloff discloses eyeglasses having indicia mounted in the temple bar.

U.S. Pat. No. 5,654,787 to Barison discloses an information holder for securing an elongated strap to the temple members of eyewear.

U.S. Pat. No. 5,537,765 to Liebman discloses a double aperture identification tag for eyeglasses.

U.S. Pat. No. 4,153,346 to Gomer discloses flexible, chain or cord-like temple members which extend over and behind the user's ears, and wherein a pendent is secured to the end of the cord-like temple members.

U.S. Pat. No. 4,974,955 to Treadaway Sr. discloses an eyeglass retainer with decorative pendent attached by chain to the distal end of the eyeglass temple piece, and releasably secured with tubing.

These prior art identification systems and devices all suffer one or more problems which make them each less than ideal. For example, one problem with these prior art designs is expense. Another is the unattractive appearance of the identification indicia. Another is having a product which will conform with the great range of shapes and sizes of eyewear manufactured today. Yet another is the ease of transferring the identification indicia from one set of eyewear to the next. Still another is the adaptability of the identification indicia to both new and existing eyewear. And still another is the ability to position the identification means on the eyewear to suit the user, or to suit the occasion on which the eyewear is worn. A further disadvantage of prior art identification systems is that they are exclusively used as identification systems and generally serve no other secondary purpose.

Thus, what is needed is an easy and attractive way to identify the owner of eyewear so that it may be promptly returned to the correct owner in the event it is lost, stolen, abandoned, or otherwise misplaced. What is further needed is an identification tag which incorporates an eyeglass repair tool. The present invention fulfills these needs and provides other related advantages.

SUMMARY OF THE INVENTION

The present invention resides in an identification tag assembly for eyeglasses which aids in the return of eyeglasses which are lost or stolen and which can be removed and used as an eyeglass repair tool.

The identification tag assembly is comprised of a tag having an eyeglass tool attached to an end so as to extend from the tag, identification indicia on a surface of the tag, and a fastener for releasably securing the tag to a pair of eyeglasses. The tag may be of a variety of shapes and designs which are necessary to the use of the identification tag assembly, such as an H-shaped elongated tag having opposite flanges at the ends thereof to aid in the securement of the tag to a temple member of the eyeglasses, or the shape of the tag may be predominately aesthetic in nature.

The eyeglass tool is typically a screwdriver which can be formed integrally with the tag at one or both ends, or attached in such a manner so as to swivel outwardly and inwardly with respect to an end of the tag.

The tag may include at least one aperture through which a portion of the fastener passes. Depending on the embodiment, various types of fasteners can be used to secure the tag to the eyeglasses. The fastener may comprise an elastic loop which can be interconnected to the tag using a link. The fastener can also include screws which extend through a plurality of apertures to secure the tag to a temple member of the eyeglasses. Alternatively, the fastener can include a pair of cable ties threaded through the plurality of apertures and cinched into a locking mechanism. The fastener may also include a pair of snap or press clips disposed at opposing ends of the tag. Still another fastener includes the use of a magnifier.

The identification indicia on the tag can also take many forms. The identification indicia may be in the form of a name, nickname, telephone number, address, e-mail address, room or locker number, company identification number, toll-free number in association with an identification number, or any other marking which identifies the owner of the glasses. A computer chip may also be used which can either be scanned for owner identification or use a clapping or whistling system to identify the location of the glasses.

On the tag, preferably on the opposite side of the indicia, there may be placed an embellishment in the form of a gem, small stone, jewel, crystal, symbol, advertising, logo, metal, magnet or other indicia of a promotional or decorative nature. The embellishment may have holistic properties.

Other features and advantages of the present invention will become apparent from the following more detailed description, taken in conjunction with the accompanying drawings which illustrate, by way of example, the principles of the invention.

BRIEF DESCRIPTION OF THE DRAWINGS

The accompanying drawings illustrate the invention. In such drawings:

FIG. 8 is a perspective view of a identification tag having cable ties threaded through apertures in the tag which may be cinched into place;

FIG. 9 is a fragmented perspective view of an H-shaped identification tag partially mounted on a temple member of a pair of eyeglasses;

DETAILED DESCRIPTION OF THE PREFERRED EMBODIMENTS

Figure 1:
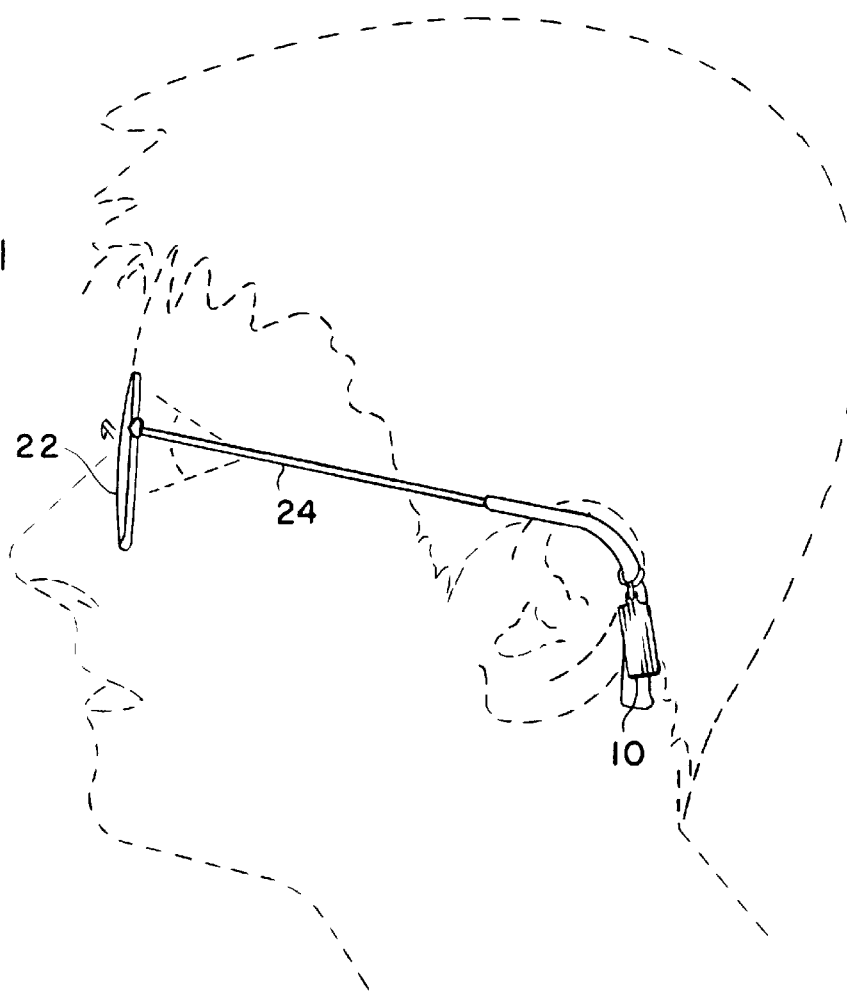
FIG. 1 is an elevational view of an exemplary set of eyeglasses shown as typically worn by an owner (shown in phantom), further illustrating an identification tag assembly attached to a temple member of the eyeglasses.
Figure 2:
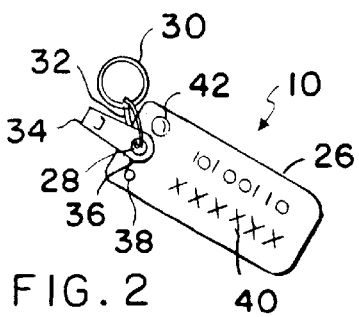
FIG. 2 is an enlarged elevational view of the tag assembly illustrated in FIG. 1, including an eyeglass repair tool in the form of a screwdriver.
Figure 3:
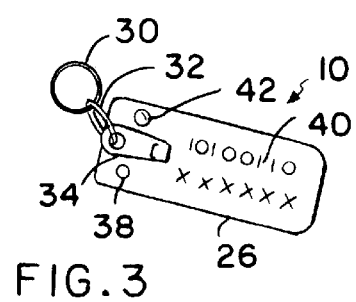
FIG. 3 is an elevational view of a tag assembly similar to FIG. 2, illustrating the screwdriver in the closed folded position.
Figure 4:
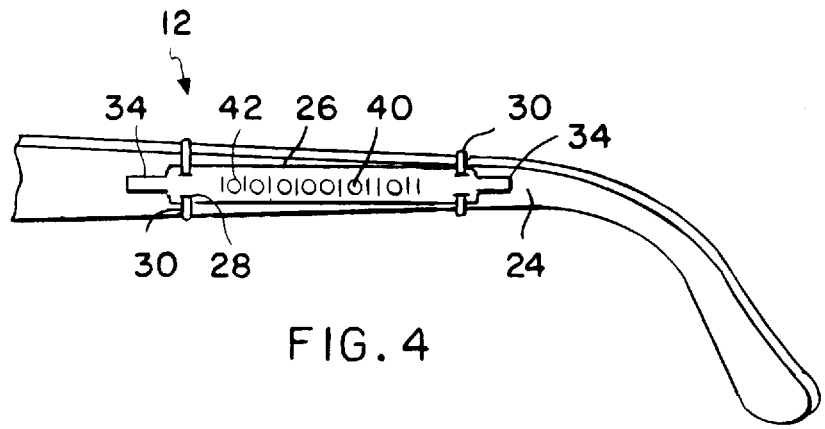
FIG. 4 is an elevational view of an eyeglass temple member having an identification tag assembly fastened thereto by two elastic loop fasteners.
Figure 5:
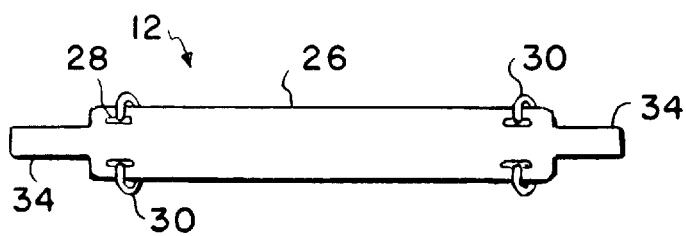
FIG. 5 is an enlarged elevational view of the identification tag assembly of FIG. 4, illustrating the screwdrivers extending from each end thereof.
Figure 6:
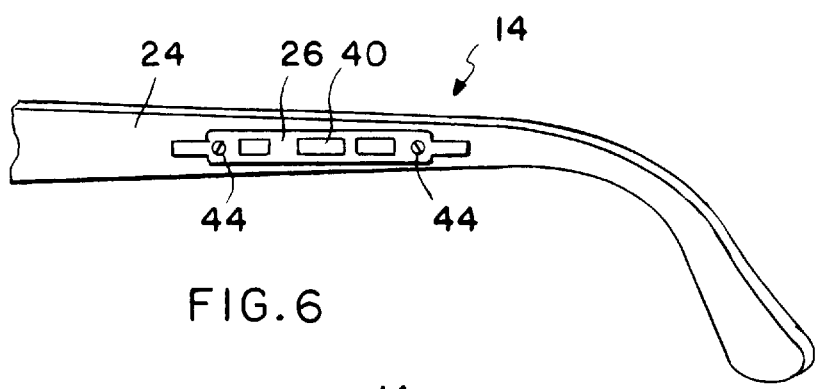
FIG. 6 is an elevational view of an eyeglass temple member having an identification tag assembly fastened to the temple member with screws.
Figure 7:
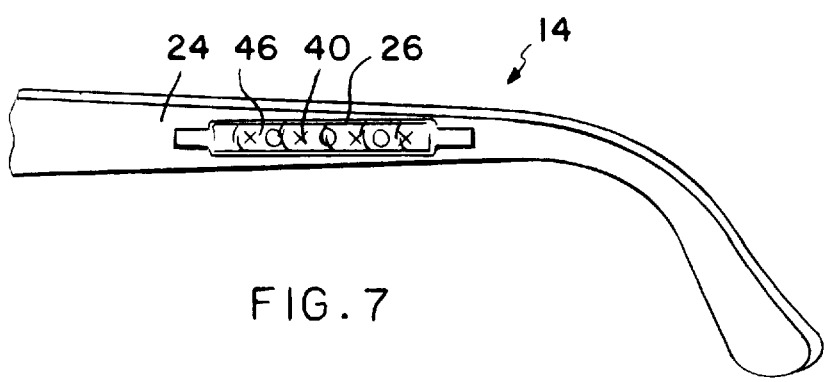
FIG. 7 is an elevational view of an eyeglass temple member having an identification tag assembly wherein the tag is attached to a magnifier which is then secured to the temple member.
Figure 10:
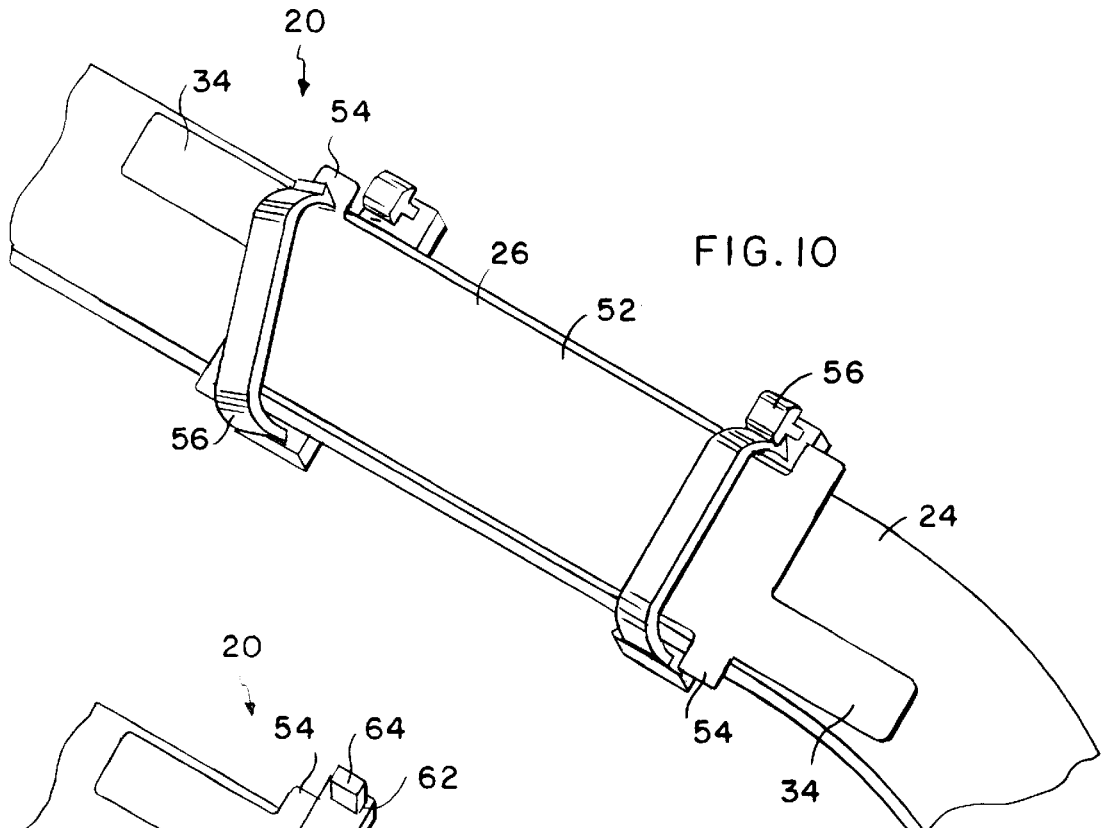
FIG. 10 is a fragmented perspective view of H-shaped identification tag similar to FIG. 9 disposed on a portion of an eyeglass temple member and having snap clips disposed at the ends of the tag.
Figure 11:
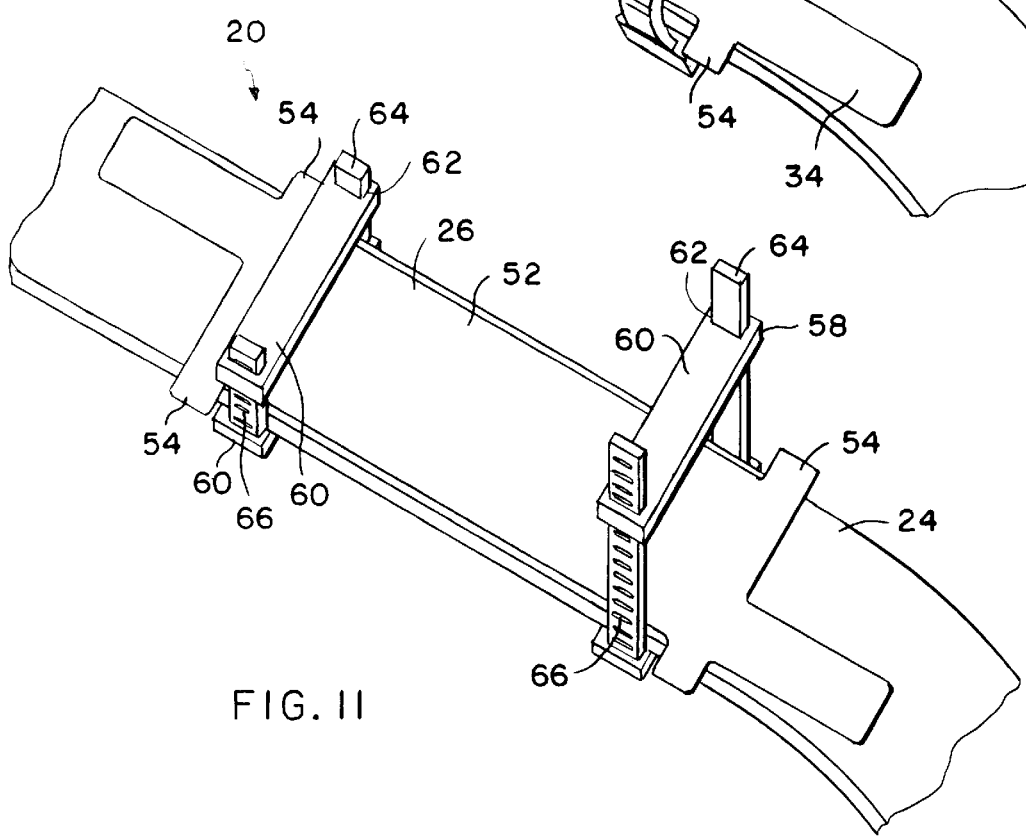
FIG. 11 is a fragmented perspective view of an H-shaped identification tag similar to FIG. 9, wherein a set of clips having plates and cross-members with teeth-like protrusions for locking are disposed at the ends of the tag is a perspective view of an H-shaped identification tag with extended end flanges which may be clamped over the temple member.

As shown in the drawings for purposes of illustration, the present invention is concerned with an identification tag assembly for eyeglasses, generally designated by the reference number 10 in FIGS. 1–3, by the reference number 12 in FIGS. 4 and 5, by the reference number 14 in FIGS. 6 and 7, by the reference number 16 in FIG. 8, by the reference number 18 in FIG. 9, and by the reference number 20 in FIGS. 10 and 11. In the description that follows, the same reference numbers will be used for functionally equivalent elements of the various illustrated embodiments.

As shown in FIG. 1, the identification tag assembly 10 is fastened to a pair of eyeglasses 22, typically to a temple member 24 of the eyeglasses 22 but not to be limited to such as the identification tag assembly 10 can be fastened or otherwise attached to any part of the eyeglasses which can comfortably accommodate the assembly 10. The identification tag assembly 10 can also be attached to accessories of the eyeglasses, such as the retaining cord and/or cord fastening buckle (not shown) which is sometimes used to prevent the glasses from falling from the owner.

As shown in FIG. 2, the identification tag assembly includes a tag 26 having an aperture 28 at one end thereof. The tag 26 may be of a variety of shapes and sizes which fit the functional and aesthetic preferences of the eyewear owner. The tag 26 may be made from metal, plastic, rubber, or any other suitable material. The tag 26 can also be formed into a variety of shapes, some of which are aesthetically pleasing such as half-moon, rectangular, circular, and others.

An elastic loop 30, typically in the form of a rubber O-ring, acts as a fastener to releasably secure the tag assembly 10 to the eyeglasses 22. The elastic loop 30 is stretched over the end of the temple member 24 and positioned at the desired location along the temple member 24, as illustrated in FIG.1. This allows the tag assembly 10 to be easily removed and transferred to another pair of eyewear.

A link 32 may extend through the aperture 28 and interlink with the elastic loop 30 and the tag 26. Aside from its functional aspects, the use of a single link 32 results in the tag 26 hanging vertically from the temple member 24, allowing the wearer of the glasses to reveal the half-moon, or other selected shaped tag, in a fashionable manner.

A eyeglass repair tool 34, typically in the form of a screwdriver as illustrated In FIGS. 2 and 3, is attached to an end of the tag 26. Preferably, the tool 34 is connected to the same end as the aperture 28 and fastener. This is easily accomplished by using a hollow rivet 36 to rivet the tool 34 to the aperture 28 of the tag 26. The rubber O-ring loop 30 and link 32, if used, can be passed through the hollow rivet 36. As illustrated in FIG. 3, the tool 34 can swing or pivot about the end so as to be in either a selected open extending or closed and folded position. Stops 38 can be used to limit the travel of the tool 34, or to lock the tool into a extended working or closed and folded position.

The tag 26 has identification indicia 40 on a side thereof. The identification indicia 40 markings may be in the form of a name, nickname, telephone number, address, e-mail address, room or locker number, company identification number, toll-free number in association with an identification number, or any other mark which identifies the owner of the glasses. A computer chip may also be used which can either be scanned for owner identification or use a clapping or whistling system to identify the location of the glasses.

A return system can be utilized whereby at the time of purchase the tag 26 is either engraved with the purchaser's personalized return information, or has provided thereon a serial number and a central toll-free number which will facilitate the return of the eyeglasses to the owner. In this regard, the buyer would register a number engraved or stamped on the tag. This number would typically include, but is not limited to, a combination of six or more individual numbers and letters, for example 000001 through Z999,999. The toll-free number, such as a 1-800 number, enables the finder of the eyewear to call the return service which can then trace the owner of the glasses. Businesses employing the return system may offer a reward to the person returning the eyeglasses.

An embellishment 42 may also be attached to the tag 26. The embellishment 42 can be in the form of a gem, small stone, jewel, crystal, symbol, advertising, logo, metal, magnet or other indicia of a promotional or decorative nature. Preferably, the embellishment includes a gem, metal or magnet which has holistic healing properties. For example, carnelian is a variety of chalcedony which is believed to energize blood, aid in tissue regeneration and facilitate concentration. Jade is believed to aid eye disorders and act as an emotional balancer. Certain metals, such as copper and gold, are believed to influence blood flow, conduct energy, aid metabolism and detoxify the body. These are listed as examples only as there are many materials which are believed to have holistic properties, any of which may be used. The tag 26 may be positioned on the inside of the temple member 24 so that it is in close proximity to the owner of the eyeglasses, to maximally impart the holistic healing effects of the embellishment 42.

As shown in FIGS. 4–6, the tag 26 may have more than one aperture 28 near its ends. Furthermore, a tool 34, in this case a flat head screwdriver head, may be attached or formed integrally with both ends of the tag 26 so as to extend from each end of the tag 26. The use of two tools 34 at each end creates convenience for the user, and also gives the tag assembly 12 and 14 a more symmetrical appearance.

The tag 26 is secured to the temple member 24 by elastic loops 30 threaded through the apertures 28 of the tag 26 and over the temple member 24. The elastic loops 30 are stretched over the temple member 24 and placed in a desired position as shown in FIG. 4. The use of two fastening elastic loops 30 holds the tag 26 in a secure horizontal position. Instead of using fastening elastic loops 30, screws 44 may be fastened directly into the temple member 24 through the apertures 28 as shown in FIG. 6.

In another embodiment, illustrated in FIG. 7, the tag 26 is positioned between a magnifier 46 and the temple member 24 of the glasses 22. A tag 26 is typically adhered to the back of the magnifier 46 so that the indicia 40 can be seen through the magnifier 46. The magnifier 46 is typically comprised of a translucent or transparent piece of glass, plastic or stone. The magnifier 46 and tag 26 are then adhered onto the temple member 24. This allows one who finds the lost or stolen glasses to easily view the identification information contained in the indicia markings 40.

FIG. 8 illustrates a deformable tag 26 with at least two apertures 28 on each end. The tag 26 may be permanently deformable, such as with metal, or resiliently deformable as with rubber. Threading, such as cable ties 48 are threaded through the apertures 28 at each end and cinched through a locking mechanism 50 to secure the tag 26 to the eyewear 22, and typically to the temple member 24. It will be appreciated by the reader that any type of threading device which can adequately secure the tag 26 to the eyewear 22 can be used with this embodiment of the identification tag assembly 16.

The embodiments shown in FIGS. 9–11 use an H-shaped, or bone shaped, tag 26 having a horizontal bar 52 and extended flanges 54 The flanges 54 may be extended as in FIG. 9 so that they are capable of being bent over the temple member 24 to secure the tag 26 to the eyewear 22. The flanges 54 can be straightened to release the tag 26 from the glasses 22 and the tag assembly 18 can be inserted onto another pair of glasses. This is helpful when the owner of the eyeglasses changes prescription or decides to purchase a new pair of eyeglasses, but does not want to obtain a new identification tag assembly. The bent extended flanges 54 may be tied off or otherwise covered so that foreign objects, such as hair, are not caught between them.

As illustrated in FIG. 10, a pair of snap clips 56 can be used to secure the identification tag assembly 20 to the glasses 22. The clips 56 are positioned near the ends of the horizontal bar 52 and clipped over the H-shaped tag 26 and the temple member 24. Use of shortened flanges 54 may be used so as to hold the clips 56 at the end of the tag 26, while providing comfort to the wearer of the eyewear. Alternatively, and as shown in FIG. 11, a set of press clips 58 can be utilized. The press clips 58 include plates 60 having apertures 62 through which cross-members 64 are inserted. The plates 60 are tightened when teeth-like protrusions 66 on the cross-members 64 are passed through the plate apertures 62, locking the cross-members 64 in place. The tag 26 is secured to the temple member 24 as the plates 60 are tightened. The excess cross-member 64 can be snipped off for comfort of the eyeglass wearer. It will be appreciated by the reader that the clips 56 and 58 described above can be removed and re-used to fasten the tag 26 to another pair of eyeglasses.

Although the description set forth above describes in detail several embodiments of the present invention for purposes of illustration, various modifications may be made to each without departing from the spirit and scope of the invention. Accordingly, the invention is not to be limited, except as by the appended claims.

What is claimed is:

1. An identification tag assembly for eyeglasses, comprising:
    a tag;
    an eyeglass tool attached to an end of the tag;
    identification indicia on at least one surface of the tag; and
    a fastener for releasably securing the tag to a pair of eyeglasses.

2. The identification tag assembly of claim 1, wherein the eyeglass tool comprises a screwdriver.

3. The identification tag assembly of claim 2, wherein the tag includes screwdrivers at opposing ends of the tag.

4. The identification tag assembly of claim 2, wherein the screwdriver swivels with respect to the end of the tag.

5. The identification tag assembly of claim 1, wherein the tag includes at least one aperture through which a portion of the fastener passes.

6. The identification tag assembly of claim 5, wherein the fastener includes at least one elastic loop.

7. The identification tag assembly of claim 5, wherein the at least one aperture comprises a plurality of apertures and the fastener includes screws which extend through the apertures to secure the tag to a temple member of the eyeglasses.

8. The identification tag assembly of claim 5, wherein the at least one aperture comprises a plurality of apertures and the fastener includes a pair of cable ties threaded through the apertures and cinched into a locking mechanism to secure the tag to the temple member.

9. The identification tag assembly of claim 1, wherein the fastener includes a pair of snap clips at opposing ends of the tag.

10. The identification tag assembly of claim 1, wherein the fastener includes a pair of press clips disposed at opposing ends of the tag.

11. The identification tag assembly of claim 1, wherein the fastener includes a magnifier.

12. The identification tag assembly of claim 1, wherein the tag includes a magnet.

13. The identification tag assembly of claim 1, wherein the identification indicia includes a computer chip.

14. The identification tag assembly of claim 1, wherein an embellishment is attached to the tag.

15. The identification tag assembly of claim 1, wherein the fastener comprises an adhesive.

16. An identification tag assembly for eyeglasses, comprising:

a tag;

at least one aperture through the tag;

an eyeglass tool comprising a screwdriver extending from the tag;

identification indicia on at least one surface of the tag; and a fastener including an elastic loop, a portion of the fastener passing through the at least one aperture, wherein the fastener releasably secures the tag to a pair of eyeglasses.

17. The identification tag assembly of claim 16, wherein the eyeglass tool swivels with respect to the end of the tag.

18. The identification tag assembly of claim 16, wherein an embellishment is attached to the tag.

19. An identification tag assembly for eyeglasses, comprising:

an H-shaped elongated tag having opposing flanges at the ends thereof;

eyeglass tools comprising screwdrivers extending from opposing ends of the tag;

identification indicia on at least one surface of the tag; and a fastener which cooperates with the flanges to releasably secure the tag to a temple member of a pair of eyeglasses.

20. The identification tag assembly of claim 19, wherein the fastener includes a pair of snap clips disposed at the ends of the tag.

21. The identification tag assembly of claim 20, wherein the fastener includes a set of clips disposed at the ends of the tag, the clips having opposing plates with apertures at each end interconnected by cross-members having teeth-like protrusions which when passed through the apertures lock in place, securing the tag and temple member between the opposing plates.

* * * * *